United States Patent [19]

Soldavini

[11] Patent Number: 4,512,144
[45] Date of Patent: Apr. 23, 1985

[54] GRASS CUTTING APPARATUS

[76] Inventor: Teodoro Soldavini, Via Leonardo da Vinci, 48, 20062 Cassano D'Adda (Milano), Italy

[21] Appl. No.: 535,285

[22] Filed: Sep. 23, 1983

[30] Foreign Application Priority Data

Oct. 13, 1982 [IT] Italy .............................. 23164/82[U]

[51] Int. Cl.³ .......................................... A01D 35/22
[52] U.S. Cl. .................................... 56/202; 56/320.2
[58] Field of Search ................... 56/202, 320.1, 320.2, 56/16.6, 16.9, 17.5, 10.7

[56] References Cited

U.S. PATENT DOCUMENTS

| 3,469,380 | 9/1969 | Howlett | 56/202 |
| 3,757,503 | 9/1973 | Soldavini | 56/202 |
| 4,250,698 | 2/1981 | Pappalardo et al. | 56/202 |

FOREIGN PATENT DOCUMENTS

| 282007 | 9/1964 | Australia | 56/202 |
| 514189 | 11/1939 | United Kingdom | 56/17.5 |
| 1210358 | 10/1970 | United Kingdom | 56/202 |

Primary Examiner—John J. Wilson
Assistant Examiner—John G. Weiss
Attorney, Agent, or Firm—Bucknam and Archer

[57] ABSTRACT

The apparatus comprises a blade rotating in a plane parallel to the ground and a casing, mounted at the front whereof on wheels and at the rear whereof on a roller, whereon an engine is mounted effective to drive the grass cutting blade and cause the apparatus to advance on the ground, an inlet chamber being further provided for sucking the cut grass and conveying it to a collecting hopper associated with the casing.

The front portion of the collecting hopper is so designed as to be superimposed over the rear roller, at least partially, in such a way as to provide a main path for the cut grass flow and prevent the cut grass from obstructing the outlet portion of the screw.

2 Claims, 5 Drawing Figures

GRASS CUTTING APPARATUS

BACKGROUND OF THE INVENTION

The present invention relates to an improved grass cutting apparatus.

As is known, grass cutting apparatus are commercially available which comprise a drive assembly or engine effective to drive a cutting blade as well as, if required, to cause the apparatus to advance on the ground, in order to facilitate the grass cutting operations.

The known grass cutting apparatus are generally provided with a housing for supporting the driving engine and enclosing the grass cutting rotating blade, which housing may be mounted on four wheels two whereof, if it is required, are driving wheels, and possibly on a front wheel pair and a rear roller which latter, if required, is coupled to a driving gear effective to cause the grass cutting apparatus to advance on the ground.

On the rear of the known grass cutting apparatus a grass collecting hopper is generally provided whereinto the cut grass is conveyed.

As the grass cutting apparatus is provided with a rear roller, baffle members are moreover provided, as affixed to the rear lower portion of the mentioned housing and superimposed on said roller, said baffle members operating in such a way as to convey the cut grass into said hopper.

That construction is affected by several drawbacks, since the provision of the baffle members remarkably obstructs the cross-section of the cut grass and air outlet port and, because of that narrowed cross-section, the cut grass is susceptible to shut off the cut grass duct, which latter is to be frequently cleaned, for each hopper discharging operation.

Moreover, the provision of the mentioned baffle members negatively affects a proper conveying of the cut grass to the collecting hopper.

Thus, the compaction of the cut grass in the collecting hopper is a poor one, and the collecting hopper requires to be frequently emptied.

SUMMARY OF THE INVENTION

Accordingly, the main object of the present invention is to overcome the above mentioned drawbacks, by providing and improved grass cutting apparatus devoid of any baffle members affixed to the housing or casing over the rear roller, thereby remarkably improving the apparatus operation and preventing any obstructions from occurring.

Another object of the present invention is to provide such an improved grass cutting apparatus wherein the operating members thereof are so designed and arranged as to assure a reliable operation.

Yet another object of the present invention is to provide such an improved grass cutting apparatus affording the possibility of optimally compacting the cut grass, thereby reducing to a minimum the hopper discharging operations and accelerating the grass cutting operations.

Yet another object of the present invention is to provide such a grass cutting apparatus which requires a reduced maintenance.

According to one aspect of the present invention, the above and other objects, which will become more apparent hereinafter, are achieved by an improved grass cutting apparatus, of the type including a blade rotating in a plane parallel to the ground, comprising a housing or casing, mounted at the front on wheels and at the rear on a roller, thereon an engine is mounted effective to drive said grass cutting blade and cause said grass cutting apparatus to advance on the ground, and provided with a chamber for sucking the cut grass and conveying the latter to a collecting hopper associated to said casing, characterized in that the front portion of said collecting hopper is so designed as to be superimposed at least partially over said roller, in such a way as to provide a main path for the cut grass flow and prevent the cut grass from obstructing the outlet portion of said screw.

BRIEF DESCRIPTION OF THE DRAWINGS

Further characteristics and advantages of the grass cutting apparatus according to the present invention will become more apparent thereinafter from the following detailed description of a preferred embodiment thereof, being illustrated, by way of an indicative example, in the accompanying drawings, where.

DESCRIPTION OF THE PREFERRED EMBODIMENT

Figure 1:
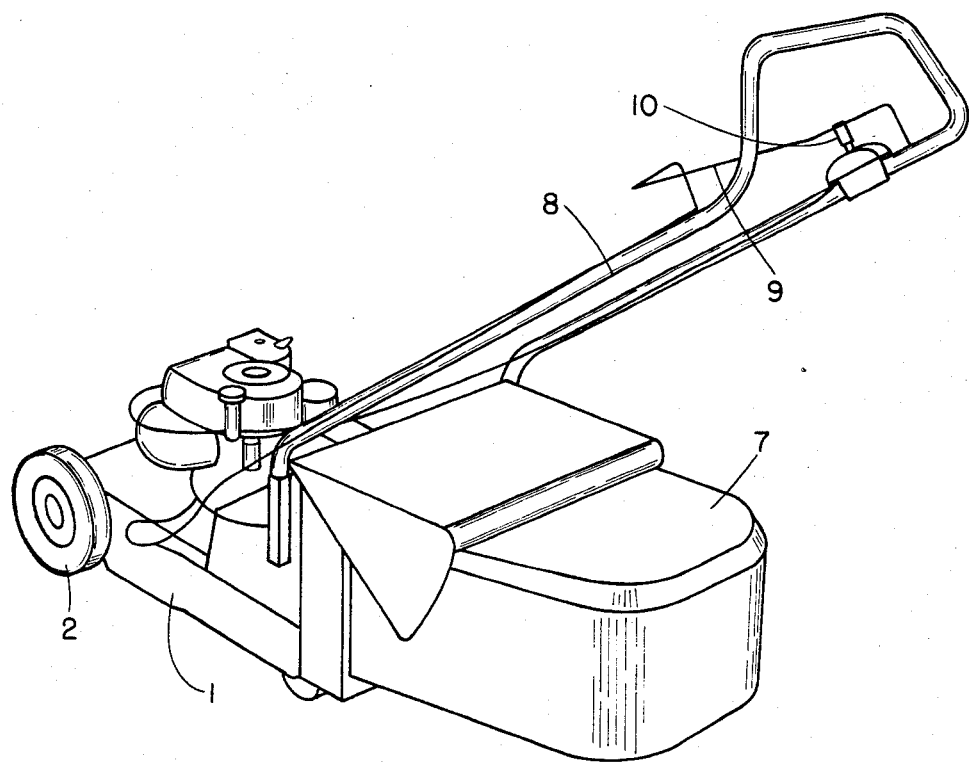
FIG. 1 is a perspective view schematically illustrating the grass cutting apparatus according to the invention.
Figure 3:
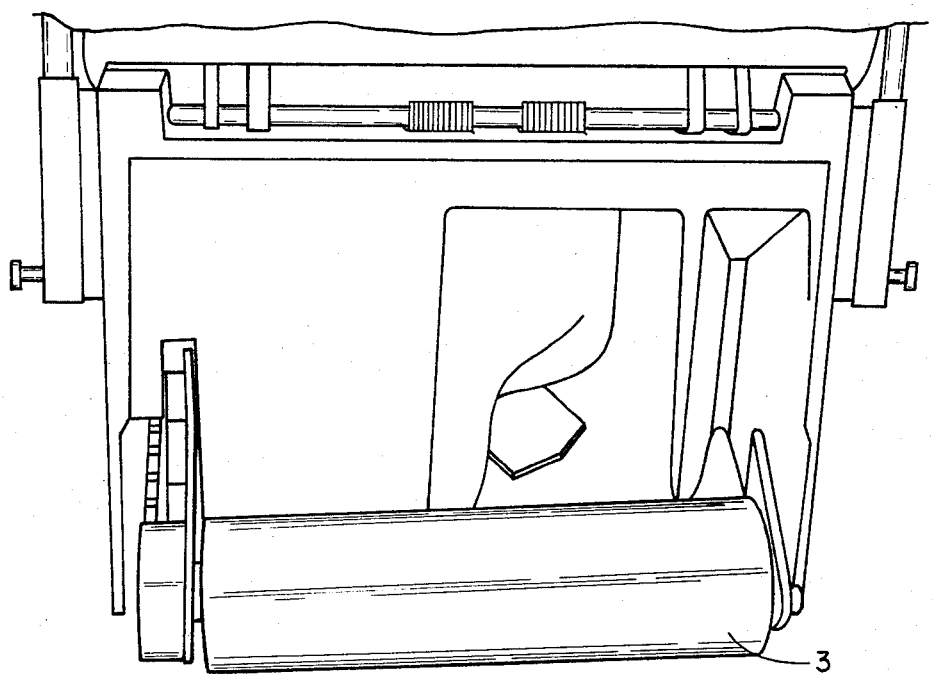
FIG. 3 illustrates the rear portion of said housing or casing as well as the rear roller included in the apparatus.
Figure 2:
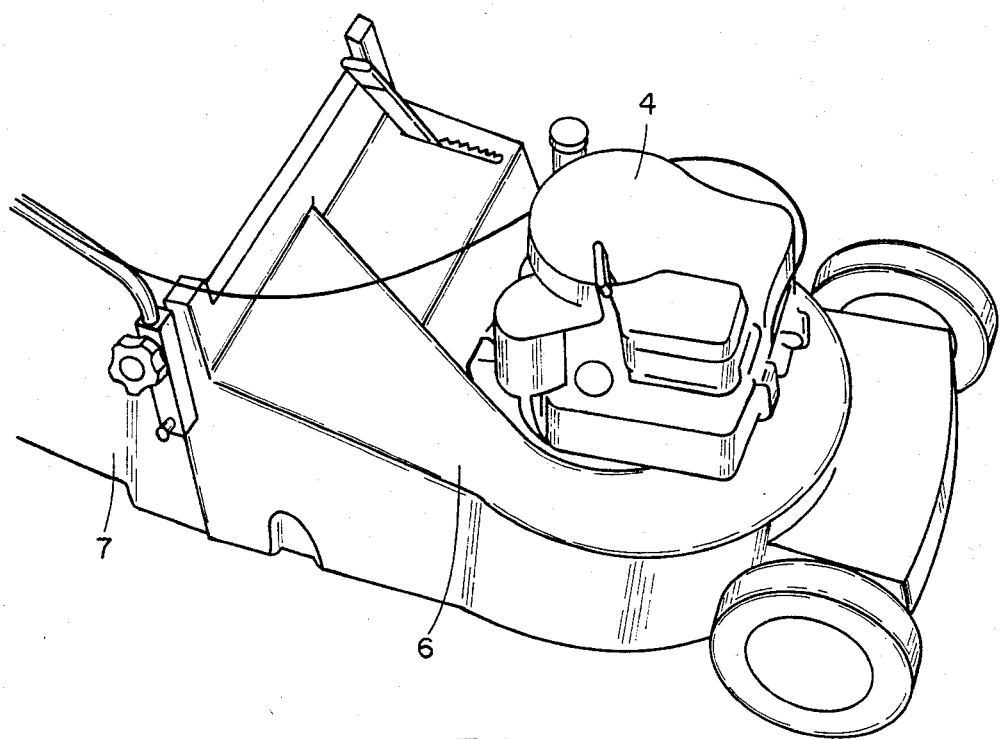
FIG. 2 illustrates the detail of the housing thereon the apparatus driving engine is mounted.

With reference to the above figures, the grass cutting apparatus according to the present invention comprises a housing or casing, generally indicated at 1, which, at the front whereof, is mounted on wheels 2 and, at the rear whereof, is mounted on a rear roller 3, which latter may be a driving roller effective to cause the apparatus to advance on the ground.

The casing 1 supports an engine 4, preferably of the internal explosion type, which operates a grass cutting blade 5 and, if required, may operate the mentioned roller 3 for causing the apparatus to advance on the ground.

At the top thereof, the casing is so shaped as to facilitate the conveying of the cut grass, by means of a chamber, indicated at 6, which practically operates to suck the cut grass and convey it to a collecting hopper 7, which latter may be affixed on the rear of said casing.

The grass cutting apparatus further comprises a handle 8, thereon control members 9 and 10 are arranged for operating the grass cutting blade and causing the grass cutting apparatus to advance on the ground.

Figure 5:
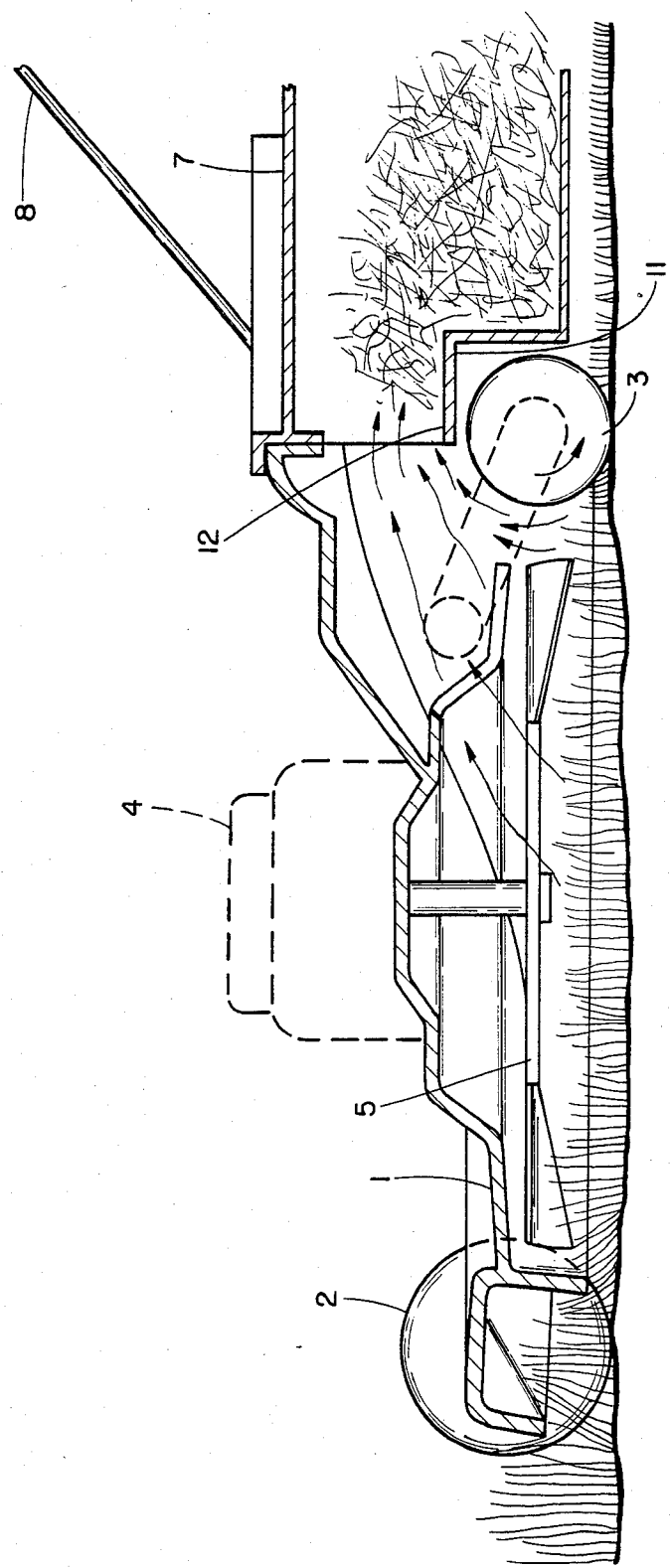
FIG. 5 illustrates, by a schematic broken away view, the coupling region between said casing and hopper of the subject grass cutting apparatus.

A main feature of the present invention is that the cut grass collecting hopper, as it is shown in a more detailed way in FIG. 5, is so shaped, at the front thereof, as to be superimposed on the roller 3.

To that end, said cut grass collecting hopper 7 is provided at the front with a stepped region 11, the horizontal portion whereof is arranged over said roller 3 and with an extended zone which penetrates the lower portion of the casing by passing over said roller 3.

Thus, owing to the absence of any baffle members, the inlet port of the hopper will be free of any obstructions by the cut grass; more specifically the cut grass which is not able of entering the full hopper (and which is susceptible to provide obstructions in the known grass cutting apparatus), is collected on the extended region 12, movable with the cut grass collecting hopper 7, and, accordingly it is removed as the grass collecting hopper 7 is disengaged from the apparatus to be emptied, in such a way as to leave the chamber 6 free of any cut grass waste, (which waste material is susceptible to obstruct the chamber and may be removed only by manual dangerous operations).

Figure 4:
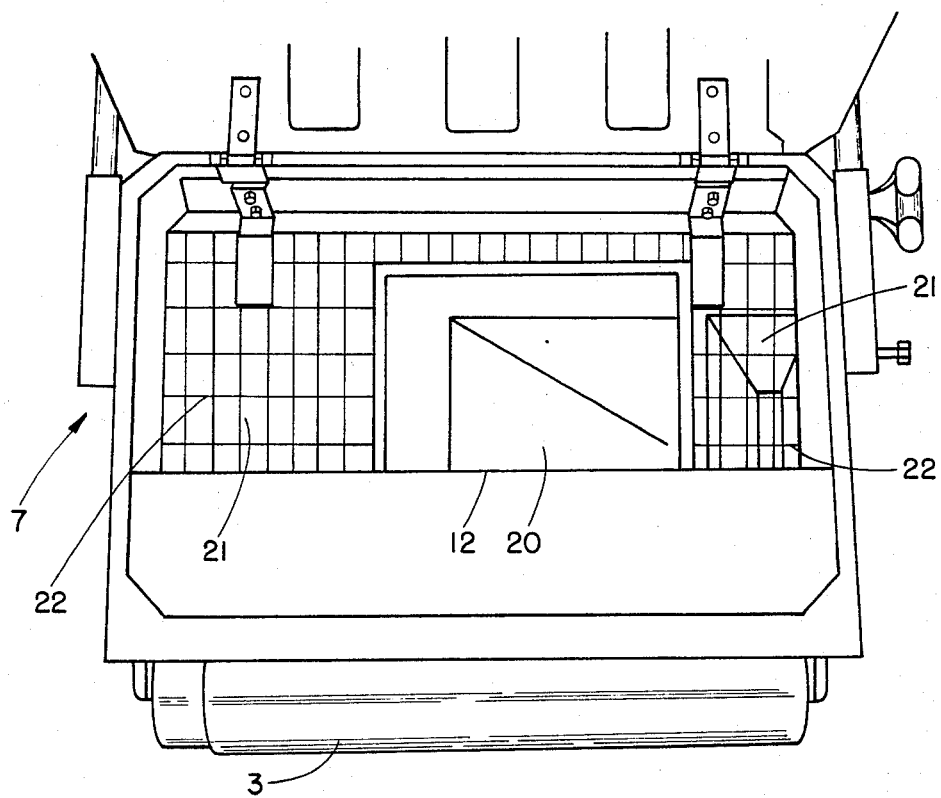
FIG. 4 illustrates the grass inlet port of the collecting hopper.

In this connection, it should be pointed out that, as it is clearly shown in FIG. 4, the cut grass collecting hopper 7 is provided with a central inlet port 20 for receiving the cut grass; the latter, after having been pushed into the collecting hopper by the cutting blade, is conveyed along a cyclone path, whereby the air flow, as projected with the cut grass by the rotating blade, returns towards the front of the collecting hopper where, laterally with respect to the central inlet port 20, there are provided air outlet openings or ports, indicated at 21, of grid shape 22, in such a way that the exiting air do not entrain the cut grass.

Thus air may be quickly discharged to the outside, thereby facilitating a great compaction of the cut grass inside the collecting hopper.

From the above disclosure it should be clear that the invention fully achieves the intended objects.

In particular it should be noted that the suitably designed front portion of the cut grass collecting hopper 7 affords the possibility of eliminating the fixed baffle member usually provided on the known grass cutting apparatus, while affording the advantage of providing a really effective cut grass inlet port devoid of any obstructions, since excess grass is removed by the extension 12 as the cut grass collecting hopper is disengaged from the apparatus and since the screw lower portion is free of any walls susceptible to retain the cut grass.

Thus any requirements is obviated of carrying out dangerous manual operations for cleaning the grass inlet chamber.

In practicing the invention the used materials, provided that they are compatible to the intended use, as well as the contingent shapes and size, may be any according to the needs.

I claim:

1. An improved grass cutting apparatus, of the type including a blade rotating in a plane parallel to the ground, comprising a housing or casing, mounted at the front on wheels and at the rear on a roller, whereon an engine is mounted effective to drive said grass cutting blade and cause said grass cutting apparatus to advance on the ground, and provided with an inlet chamber for sucking the cut grass and conveying the latter to a collecting hopper connected to said casing, characterized in that the front portion of said collecting hopper is so designed as to be superimposed at least partially on said roller, in such a way as to provide a main path for the cut grass flow and prevent the cut grass from obstructing the outlet portion of said inlet chamber and characterized in that said roller is effective to operate as a baffle member for conveying the cut grass stream towards the inlet portion of said collecting hopper.

2. An improved grass cutting apparatus according to claim 1, characterized in that said collecting hopper, at the front portion whereof, is so shaped as to be superimposed at least partially on said roller and effective to support an extension member passing over said roller and penetrating the lower portion of said inlet chamber, in such a way as to improve the cut grass flow towards said cut grass collecting hopper and prevent said cut grass from obstructing said inlet chamber.

* * * * *